Figure 1:
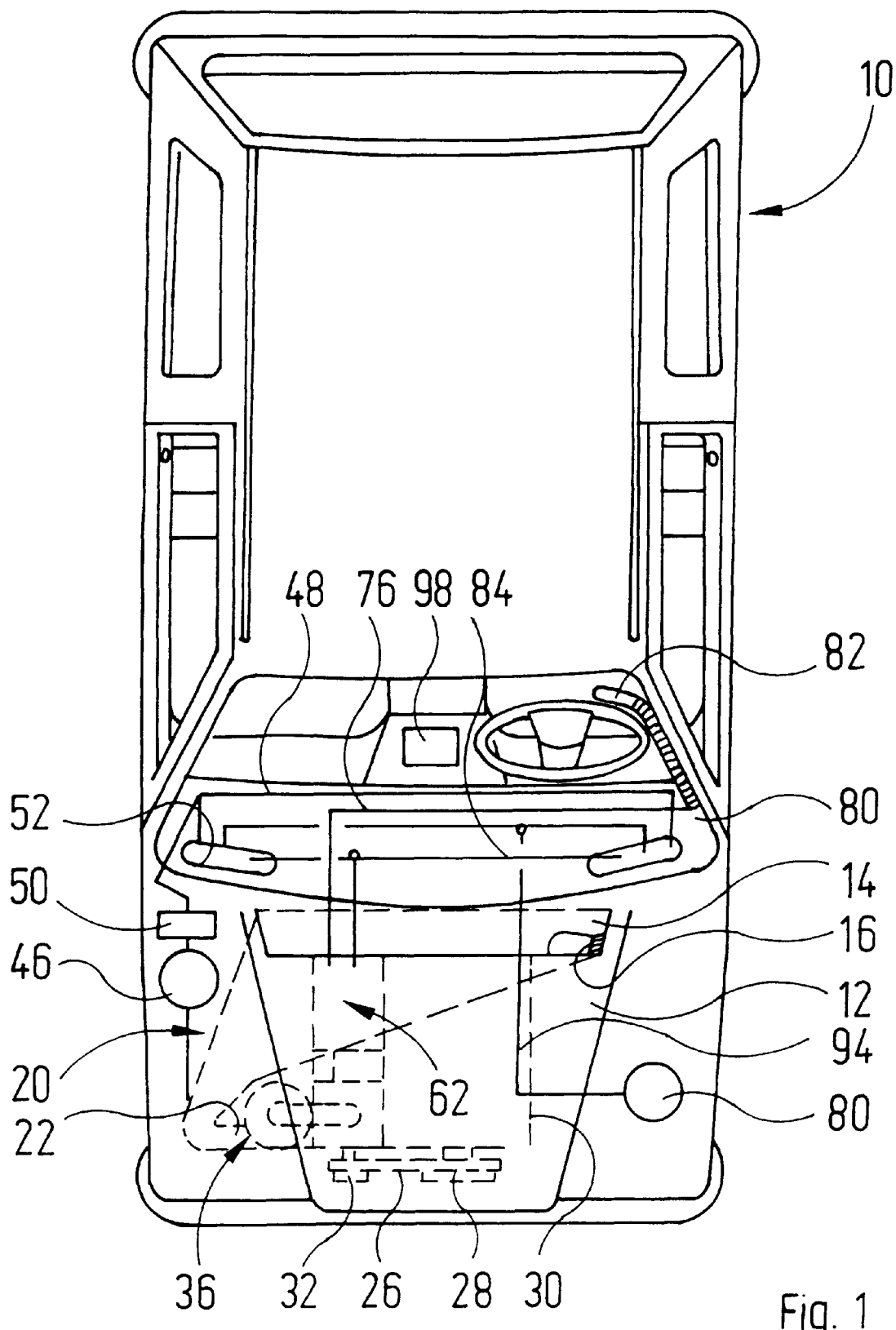

United States Patent
Tebbe

[19]

[11] Patent Number: 6,113,484
[45] Date of Patent: Sep. 5, 2000

[54] VEHICLE VENTILATION SYSTEM

[76] Inventor: Gerold Tebbe, 11, Av. Princesse Grance, MC-98000 Monte Carlo, Monaco

[21] Appl. No.: 08/981,457

[22] PCT Filed: Jun. 30, 1995

[86] PCT No.: PCT/EP95/02538

§ 371 Date: Mar. 18, 1998

§ 102(e) Date: Mar. 18, 1998

[87] PCT Pub. No.: WO97/02151

PCT Pub. Date: Jan. 23, 1997

[51] Int. Cl.$^7$ ..................................................... B60H 3/00
[52] U.S. Cl. .................................................. 454/156; 96/4
[58] Field of Search ..................... 454/156, 139, 454/143, 146; 96/4

[56] References Cited

U.S. PATENT DOCUMENTS 5,582,262  12/1996  Wust ........................................ 180/2.1

FOREIGN PATENT DOCUMENTS

| | | | |
|---|---|---|---|
| 0 483 848 A2 | 5/1992 | European Pat. Off. .......... B60H 3/00 |
| 483848A2 | 6/1992 | European Pat. Off. ................ 454/357 |
| 2 609 669 | 7/1988 | France . |
| 23 55 544 | 5/1975 | Germany . |
| 2355544 | 5/1975 | Germany ............................... 454/357 |
| 83 37 426 | 4/1984 | Germany . |
| 40 12 568 C1 | 6/1991 | Germany ........................ B60H 1/28 |
| 61195223 | 2/1985 | Japan ..................................... 454/357 |
| 2 122 103 | 1/1984 | United Kingdom . |

OTHER PUBLICATIONS

Patent Abstracts of Japan, vol. 11, No. 21 (M–555) & JP,A,61 195223 (Matsushita Electric Works Ltd) Database WPI. week 8837. Derwent Publications Ltd., London, GB; AN 88–262582 & SU,A, 1 375 910 (Lepyanko A P).

*Primary Examiner*—Harold Joyce
*Assistant Examiner*—Derek S. Boles

[57] ABSTRACT

In order to improve a vehicle driver's performance, a passenger compartment ventilation system is provided with an oxygen-enrichment unit (62) upon which fresh air acts via a compressor (24). A membrane (64) in the oxygen-enrichment unit (62) divides this flow of fresh air into a nitrogen-enriched partial flow which is discharged into the atmosphere and an oxygen-enriched partial flow which is discharged into the passenger compartment. Oxygen-enriched gas is preferably conveyed via a flexible discharge pipe (78) to the region near the driver's head.

15 Claims, 2 Drawing Sheets

VEHICLE VENTILATION SYSTEM

The invention relates to a ventilation device for a vehicle, particularly a passenger vehicle, according to the preamble of claim 1.

A ventilation device of this kind is described in DE-A-2 355 544. With this device, oxygen is supplied into the passenger compartment using oxygen stored in a pressurized container. When the stock of oxygen is exhausted the pressurized oxygen container must be exchanged for a full pressurized oxygen container. The vehicle must be stopped for this purpose. Furthermore, corresponding pressurized containers are heavy.

Ventilation devices for vehicles generally serve to supply fresh air from the environment to the passenger compartment of a vehicle. More recently, soot and pollen filters have also been used in such ventilation devices in order to free the air supplied to the passenger compartment from airborne particulates.

It is also known that an increased oxygen supply improves a human being's performance. Corresponding devices have, however, only been fairly extensively used hitherto in intensive care or in a doctor's surgery.

GB-A-2 122 103 also discloses a device which serves to supply oxygen-enriched air to the interior of a vehicle. The oxygen enrichment takes place using semi-permeable membranes to which ambient air is supplied by a compressor at pressure above atmospheric. The oxygen-enriched air discharged at the one outlet of the enrichment unit is fed into the interior of the vehicle via a fan. The fan and the compressor are driven by a common drive motor. The outlay in terms of equipment for the oxygen enrichment in the passenger compartment is therefore large, and the entire unit requires some space because of the built-on drive motor.

The object of the invention is to develop a ventilation device according to the preamble of claim 1 in such a way that the oxygen enrichment in the passenger compartment takes place at a high oxygen enrichment rate although the oxygen enrichment unit has small dimensions.

According to the invention this object is achieved by a ventilation device with the features quoted in claim 1.

The ventilation device according to the invention has the further advantage that it operates with a high degree of oxygen enrichment efficiency since the compressor upstream of the oxygen enrichment device is directly driven mechanically from the drive motor of the vehicle.

Advantageous developments of the invention are quoted in sub-claims.

Oxygen enrichment devices as quoted in claim 2 are distinguished in that they require no chemical consumables at all and operate exclusively with solid materials, not with liquid ones.

According to the development of claim 3 it is guaranteed that the compressor is automatically switched off when a sufficient quantity of fresh air to be processed is available at the inlet of the oxygen enrichment device.

The achievement according to claim 4 is that the compressor always operates for fairly long periods of time and is then idle again, is not continuously switched on and off.

According to claim 5, the removal of nitrogen-enriched residual mixture from the oxygen enrichment device is achieved in simple manner.

The geometry quoted in claim 6 provides a particularly effective flushing of the oxygen enrichment device.

The development of the invention according to claim 7 is of advantage in respect of a prevention of disturbing noises which would otherwise accompany the flushing of the oxygen enrichment device.

A ventilation device according to claim 8 guarantees that no liquid, such as is collected by the fresh air inlet when driving in rain, finds its way into the oxygen enrichment device and optionally a compressor upstream thereof.

With a ventilation device according to claim 9 the liquid collector may be particularly small as it does not require a large sump.

The development of the invention according to claim 10 is of advantage in respect of an effective collection of a large quantity of fresh air. This also provides an increase in the pressure of the air discharge of the collecting well corresponding to the decrease in cross section, so that at high vehicle speeds, a compressor which may be provided only needs to do less work; in certain circumstances the compressor may be omitted altogether in the case of vehicles used chiefly, as it were, for higher speeds.

Because of its simple geometry a collecting well as quoted in claim 11 may be produced particularly simply, and its air discharge end lies at the side of the drive motor where it may be particularly simply connected to the oxygen enrichment device or a compressor upstream thereof.

With a ventilation device according to claim 12, a fragrance may additionally act on the passenger compartment, which also has a favourable effect on the driver's performance.

According to claim 13 the output of the fragrance from a supply tank may be undertaken in a very simple and readily reproducible manner.

A ventilation device according to claim 14 guarantees that where oxygen generation is low, the surroundings of the driver's head are preferably supplied with oxygen-rich air.

With a ventilation device according to claim 15 the quantity of oxygen-enriched air which is increased at higher rotational speed of the vehicle drive motor is automatically supplied to the air discharge nozzles distributed in the vehicle.

Figure 2:
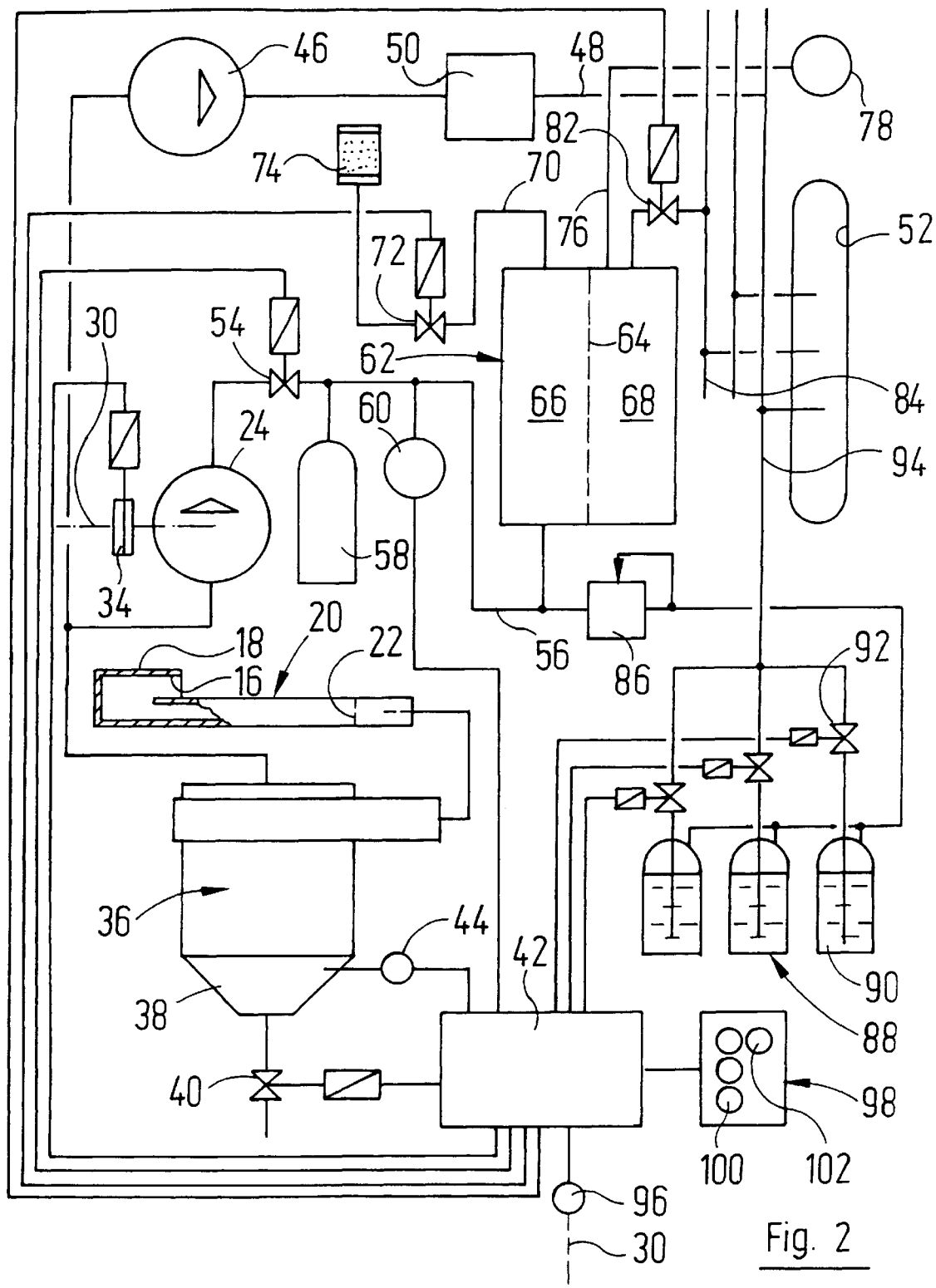

The invention will be explained in greater detail below with the aid of an embodiment with reference to the drawing, in which:

FIG. 1 shows a top view onto a passenger vehicle which is provided with a ventilation device by means of which oxygen-enriched air is supplied to the passenger compartment; and FIG. 2 shows a block diagram of the ventilation device shown in FIG. 1.

In FIG. 1, in its entirety 10 denotes a passenger vehicle whose engine hood 12 is provided with an additional scoop 14 adjacent to the windshield which extends over the majority of the width of the engine hood and together with the latter limits a wide fresh air inlet 16 whose plane is perpendicular to the longitudinal center plane of the vehicle, i.e. is open in the direction of the headwind.

The scoop 14 accommodates (see FIG. 2) an inlet.

I claim:

1. A ventilation device for a vehicle (10) with air discharge nozzles (52) in connection with a passenger compartment, which nozzles are connected to a fresh air inlet (16) via a supply line (48), in which an oxygen source is connected to the fresh air inlet (16) or an additional fresh air inlet, an outlet of which oxygen source is connected to the air discharge nozzles (52) and/or additional air discharge nozzles (78), wherein the oxygen source is formed by an oxygen enrichment device (62) to which fresh air is supplied via a compressor (24) and whose outlet providing oxygen-enriched air is connected to the air discharge nozzles (52) and/or the additional air discharge nozzles (78), and wherein the compressor (24) is driven by a drive motor (3) of the vehicle (10).

2. A ventilation device as claimed in claim 1, wherein the oxygen enrichment device (62) comprises a pack of a film material which has different permeability to oxygen and nitrogen.

3. A ventilation device as claimed in claim 1, wherein the compressor (24) is connected to the drive motor (30) via a controllable clutch (34) which is switched as a function of the output signal of a pressure transducer (60) in connection with the inlet of the oxygen enrichment device (62).

4. A ventilation device as claimed in claim 3, wherein a compressed gas reservoir (58) is connected to the outlet of the compressor (24).

5. A ventilation device as claimed in claim 1, wherein a working chamber (66), containing nitrogen-enriched gas, of the oxygen enrichment device (62) is periodically vented via a servo vent valve (72).

6. A ventilation device as claimed in claim 5, wherein the outlet of the oxygen enrichment device (62) connected to the vent valve (72) is opposite, in terms of flow, the former's inlet upon which fresh air acts.

7. A ventilation device as claimed in claim 5, wherein the outlet of the vent valve (72) is in connection with the ambient atmosphere via a sound absorber (74).

8. A ventilation device as claimed in claim 1, wherein a liquid collector (36), preferably a cyclone, is downstream of the fresh air inlet (16).

9. A ventilation device as claimed in claim 8, wherein a sump section (38) of the liquid collector (36) is periodically connectable to the surroundings via a servo discharge valve (40).

10. A ventilation device as claimed in claim 1, wherein it comprises a collecting well (20) which has a fresh air inlet (16) extending over a large part of the width of the vehicle (10) and standing perpendicular to the longitudinal center plane of the vehicle and which increasingly tapers starting from the fresh air inlet (16).

11. A ventilation device as claimed in claim 10, wherein the collecting well (20) has substantially uniform height and has substantially the shape of an asymmetrical V when viewed from the top.

12. A ventilation device as claimed in claim 1, wherein an outlet of at least one fragrance generator (88) is connected to the air discharge nozzles (52) and/or to additional discharge nozzles.

13. A ventilation device as claimed in claim 12, wherein the fragrance generators (88) each have submerged-pipe storage tanks, whose head space is connected to the outlet of the compressor (24) via a pressure-reducing pressure controller (86).

14. A ventilation device as claimed in claim 1, wherein a preferably flexible discharge pipe (78) guided in the vicinity of the driver's head is constantly connected to a working chamber (68), containing oxygen-enriched air, of the oxygen enrichment device (62) whilst air discharge nozzles (52) distributed in the passenger compartment are in connection with the working chamber (68) via a controllable throttle (82).

15. A ventilation device as claimed in claim 14, wherein the controllable throttle (82) is actuated as a function of the output signal of a rotational speed transducer (96) cooperating with the drive motor (30) of the vehicle (10).

* * * * *